2,941,926
CHLOROPHYLL DENTAL POWDER

Gerhard Martin Salzmann, Franklin Lakes, N.J., and Robert Joseph Schiraldi, New York, N.Y., assignors to Colgate-Palmolive Company, Jersey City, N.J., a corporation of Delaware No Drawing. Filed Dec. 14, 1954, Ser. No. 475,312

8 Claims. (Cl. 167—93)

The present invention relates to chlorophyll-containing dental powders and has particular reference to such powders which are characterized by a visible green hue caused by the chlorophyll contained therein.

Dentrifrices containing water-soluble chlorophyll are known. In paste form such dentrifrices have a characteristic distinct green hue, but in powder form they are white to slightly gray. For purposes of identification and easy recognition it is desirable that such dental powders exhibit the green hue characteristic of chlorophyll even through they may contain typically only 0.1% of such compound. This hue is readily achieved in the production of dental creams which contain substantial amounts of water, but has not previously been obtained in dental powders which, to be free-flowing and non-caking over long periods of storage, usually must be relatively water free. The incorporation of up to 0.5% by weight of dry chlorophyll solids in a dry dental powder is insufficient to cause the powder to take on any noticeable green coloration, although the chlorophyll solids themselves possess a very dark green hue. Normally such dry dental powders simply appear slightly gray when compared to chlorophyll free material.

In accordance with the present invention a dental powder having a green hue derived from water-soluble chlorophyll compounds contained therein comprises water-insoluble inorganic powdered material, said material including a polishing agent as the principal ingredient by weight, and a water-soluble chlorophyll compound in an amount within the range of about 0.01% to 0.5% by weight of said dental powder, said chlorophyll compound being distributed on said inorganic material and imparting a green hue to said dental powder.

The present invention also includes a process whereby such dental powders may be prepared. This process comprises mixing water-soluble chlorophyll compound, water-insoluble color carrier, and sufficient water to cause substantial visible staining of said color carrier by said chlorophyll compound, and incorporating said stained color carrier in a dental powder in sufficient proportion to impart a green hue thereto.

In general, the compositions of the present invention are prepared by staining a portion of the polishing agent which is to be included in the final dental powder composition. This involves mixing such a portion with water-soluble chlorophyll compound in the presence of sufficient water to cause substantial visible staining of the polishing agent. The thus stained portion of polishing agent then acts as a color carrier and imparts a green hue to the final dental composition when incorporated therein.

Although it is preferred to first moisten the color carrier which is being stained and to then add dry water-soluble chlorophyll compound thereto, it is satisfactory to add the water-soluble chlorophyll compound as an aqueous slurry or concentrate to powdered color carrier.

It is not essential that the color carrier employed be a portion of the polishing agent of the dental powder. It may be any water insoluble material suitable for incorportion in a dental powder and which may be stained to a green hue, e.g. fillers, bulking agents, and flavor absorbing agents such as magnesium silicate and silica gel.

The amount of color carrier employed may be varied as desired. In general it is preferred that the stained material comprise at least about 5% by weight of the final product. As an upper limit the entire formula content of water-insoluble material may be stained. It is preferred that the color carrier amount to a minor proportion, e.g. only about 5% to 15% by weight of the dental powder, as this normally enables the preparation of compositions of satisfactory hue using a minimum amount of water. Naturally, the greater the amount of color carrier which is stained, the greater the quantity of water which must be used.

The amount of water used in staining the color carrier is normally sufficient to merely dampen the solids being stained, and is insufficient to form a slurry or to dissolve all of the water-soluble chlorophyll compound employed. In general, the water used amounts to about 10% to 60% and preferably about 20% to 50% by weight of the color carrier which is stained. The color carrier must be particularly well mixed and agitated when the aqueous component is added thereto, in order to prevent lumping. Thorough mixing is also essential when the stained color carrier is disseminated in the rest of the dental powder composition.

Water-soluble chlorophyll compounds suitable for use in the present invention are well known to the art. In general they are salts, e.g. of alkali metals such as sodium and potassium, of saponified chlorophyll. The water-soluble chlorophyll derivatives may contain various metallic constituents as a portion of the molecule, typical metals being copper, magnesium and iron. Examples of suitable water-soluble chlorophyll compounds include those compounds known technically as sodium copper chlorophyllin, sodium magnesium chlorophyllin, sodium iron chlorophyllin, sodium potassium copper chlorophyllin, and potassium copper chlorophyllin.

The water-insoluble compounds used as polishing agents in the dental powders of this invention may be selected from a relatively large number of materials well known to the art. Representative materials include, for example, calcium carbonate, calcium sulfate, anhydrous dicalcium phosphate, dicalcium phosphate dihydrate, commercial tricalcium phosphate, insoluble sodium metaphosphate, aluminum hydroxide, magnesium carbonate, magnesium silicate, magnesium phosphate, sodium-calcium pyrophosphate, and calcium-pyrophosphate.

The dental powder compositions of the present invention contain a major proportion of polishing agent, generally on the order of 65% to 95%. A typical composition may also contain water, employed in staining the color carrier, in an amount equal to 1% to 5% of the total composition. It is a preferred embodiment of the present invention to employ as a polishing agent a mixture of about equal proportions (e.g. within the range of 60:40 to 40:60 parts by weight) of commercial tricalcium phosphate and calcium carbonate of specific gravity of at least 1.20 to 1.30 grams per cc., as such a mixture has been found to have particularly free-flowing and non-lumping characteristics in the presence of the moisture used in carrying out the process of the present invention. The polishing agents are employed in powdered form, the particle size being such that a major proportion of said agents passes through a U.S. No. 200 sieve. Preferably the agents are sufficiently fine that 99% thereof passes through a U.S. No. 325 sieve.

In the case of dental powders which may be subject to caking because of the presence of moisture, the stained color carrier may be dried to eliminate moisture completely or partially. As an alternative, the final composition may also be dried after the moistened and stained color carrier has been admixed therewith.

The color carrier of the present invention, once stained, does not lose its hue or ability to impart a hue to the dental powders of the present invention although such stained color carriers may be dried bone dry by the use of elevated temperatures or other means.

In addition to the essential ingredients above described the novel compositions of this invention may contain certain additional ingredients. Thus, the dentifrice compositions ordinarily will contain a detergent or cleansing ingredient. The amount of detergent and the particular detergent used may be the same as employed in convenitonal dentifrice preparations. Examples of suitable materials include soaps, i.e., water-soluble salts of higher fatty acids, as well as synthetic detergents.

The amount of detergent used depends upon the particular one selected and upon the amount of foaming action desired in the product. For example, if ordinary soaps are employed they may be used in amounts up to about 10% of the final composition whereas such materials as synthetic detergents may be used in amounts up to about 8% of the final composition.

Furthermore, flavoring materials may be used to impart a pleasant taste to the compositions and to render the same more palatable. Suitable flavoring materials include oil of wintergreen, oil of peppermint, oil of spearmint, oil of eucalyptus, cloves, menthol, anise, thyme, soluble saccharine, etc.

It is also within the ambit of the present invention to add to those dental powders containing a water-insoluble material selected from the group consisting of water-insoluble calcium and magnesium compounds, a water-soluble material selected from the group consisting of alkali metal salts of orthophosphoric acid, pyrophosphoric acid, tripolyphosphoric acid, citric acid, salicic acid, gluconic acid, and ethylene diamine tetraacetic acid. Representatve examples of these materials include mono-, di- and tri-sodium phosphate, tetrasodiumpyrophosphate, sodium tripolyphosphate, disodium pyrophosphate, sodium citrate, sodium gluconate, sodium silicate, potassium citrate, potassium gluconate, and potassium silicate. Experimental determinations indicate that in the absence of these alkali metal salts, water soluble chlorophyll compounds are not released in aqueous solutions from dental powders containing such chlorophyll compounds and polishing agents or other materials containing water-insoluble calcium or magnesium compounds. However, in the presence of these alkali metal salts, water-soluble chlorophyll is released in water-soluble form from such mixtures.

In carrying out the process of the present invention it is preferred to mix the foregoing alkali metal salts with any water-insoluble calcium or magnesium compounds forming part of the unstained color carrier before any water-soluble chlorophyll compound is added thereto. Thus, for example, in carrying out the present process using tricalcium phosphate as a color carrier, it is preferred to first dry mix unstained tricalcium phosphate with one of the foregoing alkali metal salts, then to add to that mixture the moisture to be used, and then finally, to add the water-soluble chlorophyll compound. Any sweetening or flavoring agents to be employed in the final product may be added at this stage, usually before addition of the chlorophyll compound. The mixture of stained color carrier, flavor and sweetening is then thoroughly mixed with the residue of the formulation, e.g. the bulk of the polishing agent and detergent. The aforesaid alkali metal salts may be employed in amounts up to 10% and preferably in amounts up to about 2%–3% by weight of the finished dental powder. The sodium salts are preferably used because of their relatively low cost.

EXAMPLE I

A green color carrier is prepared by thoroughly mixing the following ingredients. The order of addition of the ingredients is the order shown:

Color carrier composition

| | Parts by weight |
|---|---|
| Tricalcium phosphate, powdered | 100.0 |
| Sodium saccharinate | 1.5 |
| Flavoring | 12.5 |
| Tetrasodium pyrophosphate | 5.0 |
| Aqueous sodium copper chlorophyllin [1] | 25.525 |

[1] Consists of 0.525 part of 95% sodium copper chlorophyllin mixed with 25 parts of water.

The stained color carrier is well mixed to eliminate all lumps, and then the following polishing agents and detergent are mixed with therewith.

| | |
|---|---|
| Powdered calcium carbonate of apparent density 1.25 grams per cc. | 260 |
| Tricalcium phosphate | 73 |
| Detergent [1] | 22.5 |

[1] Consists of the sodium salt of a monosulfated monoglyceride of hydrogenated coconut oil fatty acids.

The mixture is milled two times in a hammer mill.

The product has a strong green hue, and is free-flowing. After drying by exposure to a temperature of 140° F. for three days, the product remains free-flowing, free of lumps, and has not changed in color.

The detergent of this example may be replaced by sodium lauryl sulfate, sodium lauryl sulfoacetate, sodium lauroyl sarcosinate, or sodium salt of sulfonated monoglyceride of coconut oil fatty acids.

EXAMPLE II

The compounds of Part A are heated together to 120° F. and are thoroughly mixed. A dark green aqueous medium is formed.

Part A

| | Parts by weight |
|---|---|
| Glycerine | 100 |
| Water | 100 |
| Tetrasodium pyrophosphate | 5 |
| Water-soluble potassium copper chlorophyllin | 4.48 |

A dark green color carrier is prepared by mixing the following components in the order shown:

Part B

| | Parts by weight |
|---|---|
| Powdered synthetic hydrated magnesium silicate, $MgO \cdot 2.5SiO_2H_2O$ | 35.0 |
| Sodium saccharinate | 1.5 |
| Flavoring | 12.5 |
| Part A (above) | 26.2 |
| Tetrasodium pyrophosphate | 5.0 |
| Detergent of Example I | 22.5 |

After all of the above materials are well mixed, the following Part C is added to Part B.

Part C

| | Parts by weight |
|---|---|
| Dicalcium phosphate | 397.3 |

The mixture of Parts B and C is twice passed through a hammer mill. The dental powder thus prepared has a green hue.

EXAMPLE III

The following components are mixed, being added in the order shown:

Part A

| | Parts by weight |
|---|---|
| Tricalcium phosphate | 200 |
| Flavor | 25 |
| Sodium saccharinate | 3 |
| Tetrasodium pyrophosphate | 20 |
| Water | 50 |
| Sodium copper chlorophyllin (94%) | 1.06 |

To Part A, which acts as a color carrier, is added:

| | Parts by weight |
|---|---|
| Detergent of Example I | 45 |
| Tricalcium phosphate | 228 |
| Calcium carbonate of apparent density 1.25 grams per cc | 427.94 |

The final mixture is passed through a hammer mill two times to insure thorough distribution of the color carrier throughout the mixture. The product has a strong green hue.

A sample of the thus produced product is slurried with four times its own weight of water. The slurry has a pH of 8.4.

A portion of the product is dried for eight days at 110° F. No change in color occurs.

The powder is tested for tendency to lump by exposure of certain portions thereof to 90% relative humidity at room temperature, and other portions to 90% relative humidity at 110° F. The tests are run for twelve days. In both cases the product remains free-flowing and non-lumpy.

The extent to which the chlorophyll present in the aged "lump-test" specimens is released in aqueous media is determined by contacting a portion of the powder with water, and then analyzing, for its chlorophyll content, the aqueous solution thus produced. The powder aged at room temperature is thus found to release 96% of its initial chlorophyll, and the powder aged at 110° F., releases 89%.

EXAMPLE IV

A chlorophyll-containing dental powder having a green hue is prepared as follows:

Part A

| | Parts by weight |
|---|---|
| Ticalcium phosphate | 100 |
| Flavoring | 12.5 |
| Sodium saccharinate | 1.5 |
| Tetrasodium pyrophosphate and sodium acid pyrophosphate, a mixture of equal parts by weight | 10 |
| Water | 25 |
| Potassium copper chlorophyllin (94%) | 0.8 |

The components of Part A are thoroughly mixed and then the following materials are added thereto in the order shown below:

| | |
|---|---|
| Detergent of Example I | 25.5 |
| Tricalcium phosphate | 114 |
| Calcium carbonate of Example I | 213.7 |

The completed mixture is milled in a hammer mill two times. The product has a light green hue. Another powder, prepared with the same components according to a similar process with the exception that the water is added to Part A after the water-soluble chlorophyll compound and the pyrophosphate have been added, has the same hue as the product prepared above.

EXAMPLE V

A free-flowing chlorophyll-containing dental powder having a green hue is prepared according to the following formulation:

Part A

| | Parts by weight |
|---|---|
| Tricalcium phosphate | 100 |
| Flavoring | 12.5 |
| Sodium saccharinate | 1.5 |
| Sodium acid pyrophosphate | 10 |
| Water | 25 |
| Sodium copper chlorophyllin (94%) | 0.8 |

The components of Part A are thoroughly mixed and then the following materials are added thereto:

| | |
|---|---|
| Detergent of Example I | 22.5 |
| Tricalcium phosphate | 114 |
| Calcium carbonate of Example I | 213.7 |

The mixture is milled twice in a hammer mill to insure thorough mixing of the components. The finished powder contains 5% moisture, is free-flowing and devoid of lumps.

After exposure of a portion of the powder for three days to a temperature of 110° F., the dried powder shows no change in color. Similar results are obtained if the powder is dried at 140° F. The pH of a 20% slurry of this dental powder is 7.10, and 55% of the original water-soluble chlorophyll employed is recovered on aqueous extraction of the powder.

EXAMPLE VI

The undried powder of Example V is dried overnight at 140° F. A loss in weight of 6.9% occurs, however the powder has the same color as an undried control. The dried powder is somewhat more free-flowing than the undried material.

EXAMPLE VII

A free-flowing, non-lumping dental powder which contains water-soluble chlorophyll and has a visible green hue from the chlorophyll contained therein may be prepared as follows:

Part A

| | Parts by weight |
|---|---|
| Tricalcium phosphate | 20 |
| Flavoring | 2.5 |
| Sodium saccharinate | 0.3 |
| Tetrasodium pyrophosphate | 1 |
| Sodium acid pyrophosphate | 1 |
| Water | 5 |
| Potassium copper chlorophyllin (94%) | 0.159 |

The tricalcium phosphate, saccharinate, flavor and water are mixed well, and the tetrasodium pyrophosphate and sodium acid pyrophosphate are added thereto and thoroughly mixed in. The water-soluble chlorophyll compound is then added and after one minute of mixing Part A is stained a uniform dark green. Part A is added to previously prepared Part B which consists of:

Part B

| | Parts by weight |
|---|---|
| Tricalcium phosphate | 27 |
| Detergent of Example I | 4.5 |
| Calcium carbonate of Example I | 38.541 |

The mixture of Parts A and B is agitated for ½ hour and is passed through a hammer mill. After mililng, the powder is further mixed in a horizontal ribbon type mixer for ½ hour. The apparent density of the product is 0.85 gm./cc., it has a pH (in 20% aqueous slurry) of 9.00, and 55% of the chlorophyll initially employed is recovered on equeous extraction of the powder.

A portion of the powder is subjected to a steam lumping test which consists of exposing an open can of dental powder to an atmosphere of live steam for three hours. The powder remains free-flowing.

EXAMPLE VIII

A dental powder is prepared as follows:

Part A

| | Parts by weight |
|---|---|
| Tricalcium phosphate | 50 |
| Sodium saccharinate | 1.5 |
| Flavoring | 12.5 |
| Water | 25 |
| Tetrasodium pyrophosphate | 2.5 |
| Sodium acid pyrophosphate | 7.5 |
| Potassium copper chlorophyllin (94%) | 0.8 |

The tricalcium phosphate, flavoring and sodium saccharinate are mixed in a horizontal ribbon mixer for three minutes, water and the pyrophosphates are added together, and the mix is agitated for two minutes. The chlorophyllin is then added and the mixture is agitated for ten minutes. To this mixture is added the following:

| | Parts by weight |
|---|---|
| Tricalcium phosphate | 185 |
| Detergent of Example I | 22.5 |
| Dicalcium phosphate | 192.7 |

The final mixture is passed through a powder mill and dried at 120° F. It has a strong green hue.

It is also within the scope of the invention to incorporate in the present dental powders various adjuvants which have been described as useful in the art. Thus, for example, there may be present such adjuvants as sodium dehydroacetate; various ammonia derivatives such as diammonium phosphate, urea and/or ammonium carbonate; fluorides such as sodium and tin fluoride; antibiotics such as penicillin and tyrothrycin; and anti-caries agents such as sodium N-lauroyl sarcosinate.

Although the present invention has been described with reference to particular embodiments and examples, it will be apparent to those skilled in the art that variations and modifications of the invention can be made and that equivalents can be substituted therefor without departing from the principles and true spirit of the invention.

What is claimed is:

1. A process for the preparation of a dental powder comprising mixing water-soluble chlorophyll compound, water-insoluble color carrier, and an amount of water sufficient to moisten and cause substantial visible staining of said color carrier by said chlorophyll compound but insufficient to form a slurry with said carrier, and incorporating said stained color carrier in a dental powder in sufficient proportion to impart a green hue thereto.

2. A process for the preparation of a dental powder comprising mixing water-soluble chloropyhll compound, polishing agent, and an amount of water sufficient to moisten and cause substantial visible staining of said polishing agent by said chlorophyll compound but insufficient to form a slurry with said polishing agent, and incorporating said stained polishing agent in a dental powder in sufficient amount to impart a green hue thereto.

3. A process for the preparation of a dental powder as set forth in claim 2 wherein said polishing agent is tricalcium phosphate.

4. A process for the preparation of a dental powder as set forth in claim 2 wherein said stained polishing agent comprises about 5% to 20% by weight of said dental powder.

5. A process for the preparation of a dental powder as set forth in claim 7 wherein said moisture is present in an amount equal to about 1% to 5% of said dental powder.

6. A process for the preparation of a dental powder comprising mixing water-insoluble material selected from the group consisting of water-insoluble calcium and magnesium compounds, a compound selected from the group consisting of alkali metal salts of orthophosphoric acid, pyrophosphoric acid, tripolyphosphoric acid, citric acid, silicic acid, gluconic acid and ethylene diamine tetraacetic acid, water-soluble chlorophyll compound, and an amount of water sufficient to moisten and cause substantial visible staining of said water-insoluble material by said chlorophyll compound but insufficient to form a slurry with said water insoluble material, and incorporating said stained water-insoluble material in a dental powder in sufficient proportion to impart a green hue thereto.

7. A process for the preparation of a dental powder comprising forming a mixture of water-insoluble color carrier, a water-soluble chlorophyll compound and an amount of water sufficient to moisten and cause substantial visible staining of said color carrier by said chlorophyll compound but insufficient to form a slurry with said carrier, and incorporating said stained color carrier with a polishing agent consisting of a mixture of calcium carbonate of apparent density of about 1.20 to 1.30 and tricalcium phosphate.

8. A process for the preparation of a dental powder comprising forming a mixture of water-insoluble color carrier, a water-soluble chlorophyll compound and an amount of water sufficient to moisten and cause substantial visible staining of said color carrier by said chlorophyll compound but insufficient to form a slurry with said carrier, and incorporating said stained color carrier with a polishing agent consisting of a mixture of calcium carbonate of apparent density of about 1.25 and tricalcium phosphate.

References Cited in the file of this patent

UNITED STATES PATENTS

| | | |
|---|---|---|
| 1,841,309 | Vanderbilt | Jan. 12, 1932 |
| 1,943,856 | Cross | Jan. 16, 1934 |
| 2,041,473 | Janota | May 19, 1936 |
| 2,069,157 | Sahyun | Jan. 26, 1937 |
| 2,191,199 | Hall | Feb. 20, 1940 |
| 2,196,150 | Heald | Apr. 2, 1940 |
| 2,211,369 | Durgin | Aug. 13, 1940 |
| 2,685,517 | Dunmire | Aug. 3, 1954 |

FOREIGN PATENTS

| | | |
|---|---|---|
| 444,276 | Great Britain | Mar. 18, 1936 |
| 522,646 | Great Britain | June 24, 1940 |
| 601,801 | Great Britain | May 12, 1948 |
| 625,727 | Great Britain | July 4, 1949 |

OTHER REFERENCES

Remington: Practice of Pharmacy, 9th ed., 1948, Mack Publishing Co., Easton, Pa., pp. 283 and 1379.

Handbook of Chem. and Physics, 31st ed., 1949, Chem. Rubber Publishing Co., Cleveland, Ohio, pp. 416–7, 420, 421 and 2669.

Quart. J. Pharm. and Pharmacol., vol. 12, 1939, p. 789.

Drug and Cos. Ind., May 1953, vol. 72, No. 5, p. 671.

J. Am. Dent. Asso., March 1949, pp. 369, 370.

Rothemund Glasser's Med. Physics Year Book Pub., 1948, p. 171.

Sperandio-Bull. Amer. Soc. Hosp. Pharmacists, October 1941, vol. 8, No. 5, pp. 292–297 (p. 296 pert.).

Am. Perf. and Ess. Oil Review, November 1951, vol. 58, No. 5, pp. 349–350.